US008722225B2

(12) United States Patent
Kim et al.

(10) Patent No.: US 8,722,225 B2
(45) Date of Patent: May 13, 2014

(54) BATTERY MODULE INCLUDING IMPROVED BASE PLATE

(75) Inventors: Myung-Chul Kim, Suwon-si (KR); Tae-Yong Kim, Suwon-si (KR); Hyun-Ye Lee, Suwon-si (KR); Shi-Dong Park, Suwon-si (KR)

(73) Assignees: Samsung SDI Co., Ltd., Yongin-Si, Gyeonggi-Do (KR); ROBERT BOSCH GmbH, Stuttgart (DE)

(*) Notice: Subject to any disclaimer, the term of this patent is extended or adjusted under 35 U.S.C. 154(b) by 149 days.

(21) Appl. No.: 12/805,666

(22) Filed: Aug. 12, 2010

(65) Prior Publication Data

US 2011/0104543 A1 May 5, 2011

(30) Foreign Application Priority Data

Nov. 3, 2009 (KR) .................. 10-2009-0105497

(51) Int. Cl.
*H01M 2/10* (2006.01)
(52) U.S. Cl.
USPC ............................................. 429/99; 429/155
(58) Field of Classification Search
USPC ................................. 429/156, 151, 99, 155
See application file for complete search history.

(56) References Cited

U.S. PATENT DOCUMENTS

| 6,326,103 | B1 * | 12/2001 | Ido et al. ................ 429/156 |
| 6,465,123 | B1 * | 10/2002 | Baumann et al. .......... 429/99 |
| 2006/0178040 | A1 * | 8/2006 | Kurosawa ................ 439/500 |
| 2007/0037051 | A1 * | 2/2007 | Kim et al. ............... 429/151 |
| 2010/0215998 | A1 * | 8/2010 | Byun et al. .............. 429/82 |

FOREIGN PATENT DOCUMENTS

| JP | 05-275072 A | 10/1993 |
| JP | 2005-302590 A | 10/2005 |
| KR | 10 2009-0000297 A | 1/2009 |
| KR | 20100097404 A * | 9/2010 |

OTHER PUBLICATIONS

Korean Office Action in KR 10-2009-0105497, dated Mar. 22, 2011 (Kim, et al.), Korean Office Action from prosecution of corresponding Korean application.

* cited by examiner

*Primary Examiner* — Ula C Ruddock
*Assistant Examiner* — Frank Chernow
(74) *Attorney, Agent, or Firm* — Lee & Morse, P.C.

(57) ABSTRACT

A battery module includes a base plate, a plurality of batteries on the base plate, and a reinforcing portion on the base plate for reinforcing the base plate. Therefore, deformation of the base plate is prevented.

20 Claims, 4 Drawing Sheets

BATTERY MODULE INCLUDING IMPROVED BASE PLATE

BACKGROUND

1. Field

Example embodiments relate to a battery module with a plurality of connected batteries.

2. Description of the Related Art

A battery module may be fabricated by connecting a plurality of batteries, and may be an element of a large capacity power supply unit. Such a battery module may be used as a power source, e.g., in electric cars.

However, when the battery module is used in an electric car, a battery pack including a plurality of stacked battery modules may be used. Thus, a large weight may be applied to a base plate of a bottom battery module supporting the plurality of batteries.

SUMMARY

Embodiments are therefore directed to a battery module, which substantially overcomes one or more of the problems due to the limitations and disadvantages of the related art.

It is therefore a feature of an embodiment to provide a battery module having a base plate with increased strength.

At least one of the above and other features and advantages may be realized by providing a battery module, including a plurality of batteries, and a base plate on which the plurality of batteries are mounted, wherein a reinforcing portion for reinforcing the base plate against a load applied to the base plate is formed on the base plate.

The reinforcing portion may include a bent portion integral with the base plate and which is formed by bending the base plate.

Recesses for holding the plurality of batteries may be formed on the base plate by the bent portion. The bent portion may be bent to protrude toward the plurality of batteries. The bent portion protruding to the plurality of batteries may form a distance between the batteries.

The bent portion may be formed as a square bar. The plurality of batteries may be disposed between a pair of end plates, and the pair of end plates may be coupled to the base plate.

The reinforcing portion may include a plurality of bent portions spaced apart from each other on the base plate. The reinforcing portion may include first and second bent portions protruding in opposite directions. The reinforcing portion may include a plurality of bent portions extending along an entire longitudinal direction of the base plate. The reinforcing portion may extend away from a first surface in the base plate to define a recess in the first surface.

The battery module may further include a plurality of separation plates installed between the plurality of batteries, and a side bar connecting the end plates to the separation plates. A plurality of the battery modules may be assembled to form a battery pack that is used as a power source in an electric car.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
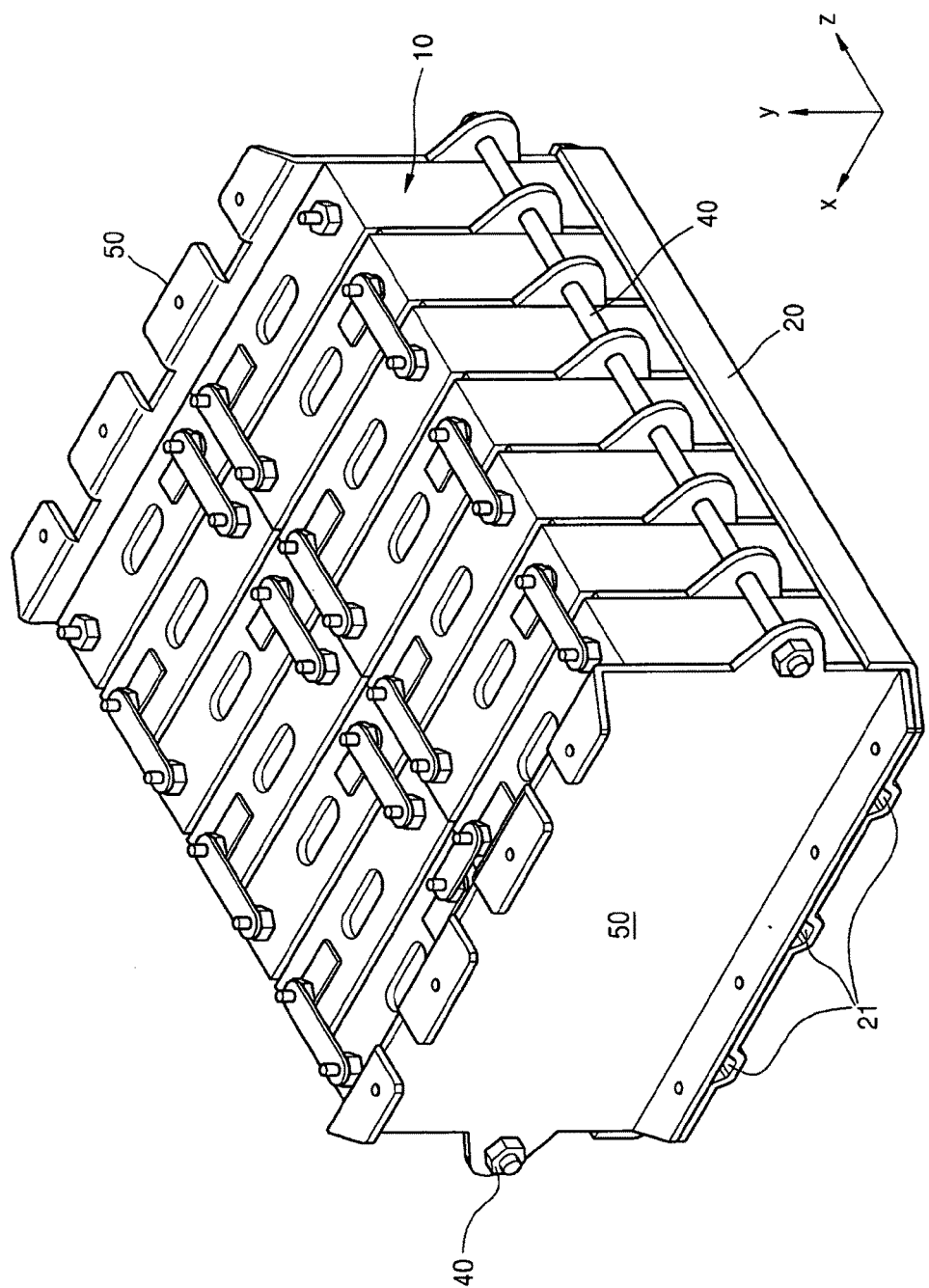
FIG. 1 illustrates a perspective view of a battery module according to an embodiment.

Korean Patent Application No. 10-2009-00105497, filed on Nov. 3, 2009, in the Korean Intellectual Property Office, and entitled: "Battery Module Including Improved Base Plate," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
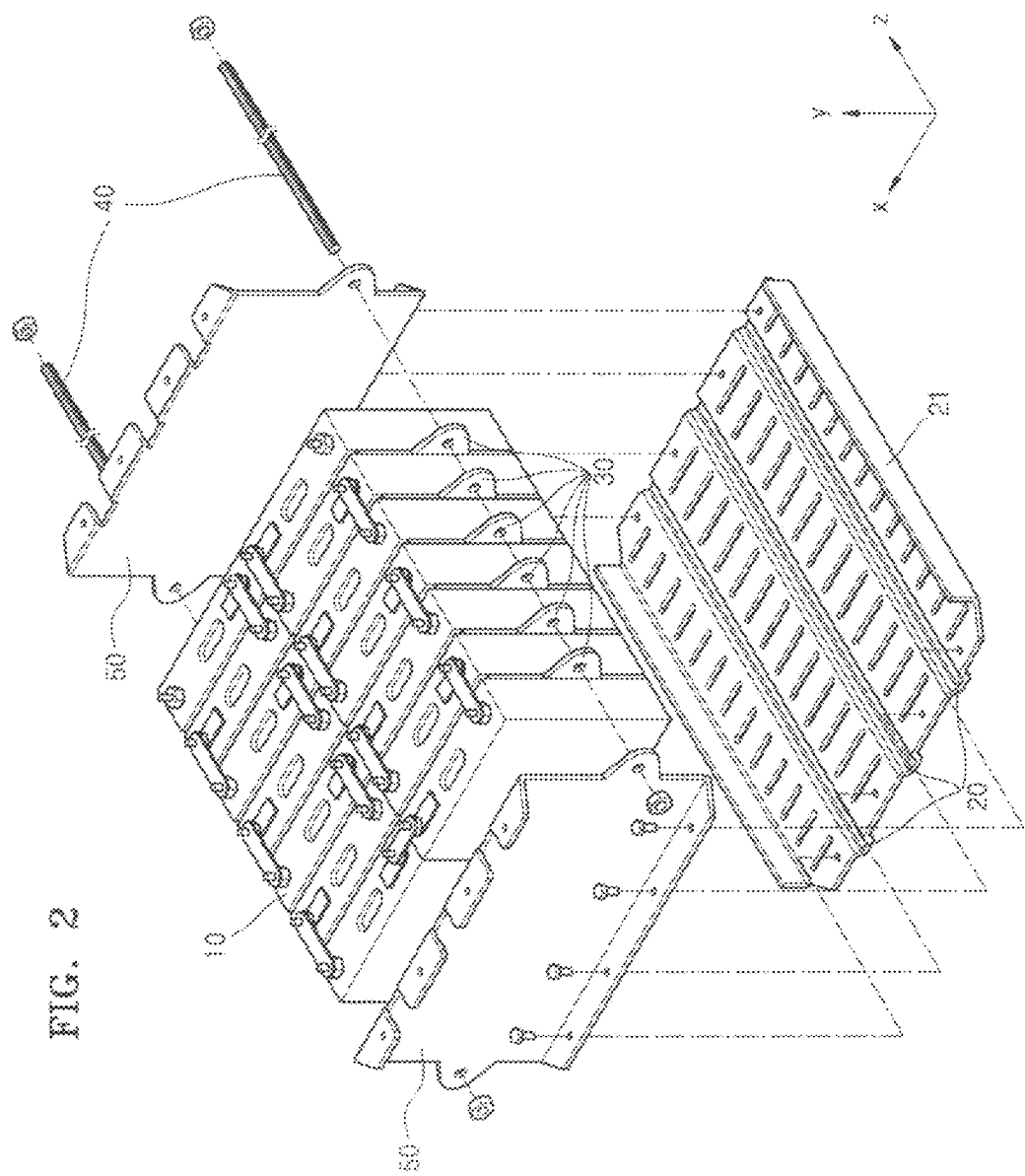
FIG. 2 illustrates an exploded perspective view of the battery module in FIG. 1.

FIGS. 1 and 2 illustrate assembled and exploded perspective views, respectively, of a battery module according to an embodiment. Referring to FIGS. 1 and 2, the battery module may include a plurality of batteries 10 connected to each other, e.g., in two rows, a base plate 20 supporting the batteries 10, separation plates 30 inserted between the batteries 10 for performing a cooling operation, and a side bar 40 connecting the separation plates 30 to the base plate 20. As illustrated in FIGS. 1 and 2, the batteries 10, the separation plates 30, and the side bar 40 may be on the base plate 20, so weights of almost all of the elements including the batteries 10 may be supported by the base plate 20.

Further, as illustrated in FIGS. 1 and 2, the battery module may include end plates 50 installed on both ends of the rows of batteries 10 and coupled to the base plate 20. The end plates 50 may prevent the batteries 10 from escaping in a direction in which the batteries 10 are connected in the rows, e.g., along the z-axis.

As further illustrated in FIGS. 1 and 2, the battery module according to an example embodiment may include bent portions 21 on the base plate 20. The bent portions 21 may be integral with the base plate 20, and may be formed by bending the base plate 20. When the batteries 10 are positioned on the base plate 20, the bent portions 21 may extend, i.e., be bent, to protrude away from the batteries 10. For example, the base plate 20 may include a substantially flat surface, and may include portions with bent shapes, e.g., circular or polygonal, that extend away from the substantially flat surface and define the bent portions 21, e.g., the bent portions 21 may have U-shaped cross sections in the xy-plane relative to the substantially flat surface of the base plate 20 in the xz-plane. The bent portions 21 may have a substantially uniform structure, e.g., the bent portions 21 may be formed as square bars by bending the base plate 20 in order to reinforce the base plate 20. For example, the bent portions 21 may extend along an entire longitudinal direction of the base plate 20, e.g., along the z-axis, and may be spaced apart from each other along the x-axis, e.g., one bent portion 21 may connect two portions of the substantially flat surface of the base plate 20. For example, parts of the bent portions 21, which are aligned in the same direction as the direction in which the load is applied, may perform as posts.

The bent portions 21 may be formed as reinforcing portions in order to increase strength of the base plate 20, which supports a large weight. The base plate 20 with the bent portions 21 may have an increased strength, e.g., as compared to a flat plate without bent portions, because the strength of the bent portions 21 increases due to work hardening during formation thereof. In contrast, a flat plate without bent portions, i.e., a simple plate structure, may not be able to support the weight of the components mounted thereon, thereby causing deformation of the base plate and unstable battery module, e.g., it may be difficult to attach/detach the battery module onto/from a desired location on the base plate. Therefore, the bent portions 21 according to example embodiments may increase the strength of the base plate 20 to support the weight, thereby reducing a possibility of the base plate 20 deformation, and accordingly, increasing stability of the battery module.

In particular, when a plurality of battery modules is stacked in a battery pack, a greater load may be applied to a battery module disposed on a bottom of the battery pack than that to upper battery modules. Thus, when the base plate 20 having an increased strength, i.e., an improved load resistant property, is used, the possibility of deformation of the bottom of the battery pack may be substantially reduced even when a plurality of battery modules are stacked in multiple layers. Therefore, deformation caused by the load applied to the base plate 20 may be efficiently prevented, and accordingly, a stable battery module may be configured. In addition, when a battery pack that is used as a power source in an electric car is formed, a plurality of battery modules may be assembled. Here, since the battery modules, which form the battery pack, may be stabilized, the battery pack may also have a stable structure.

Figure 3:
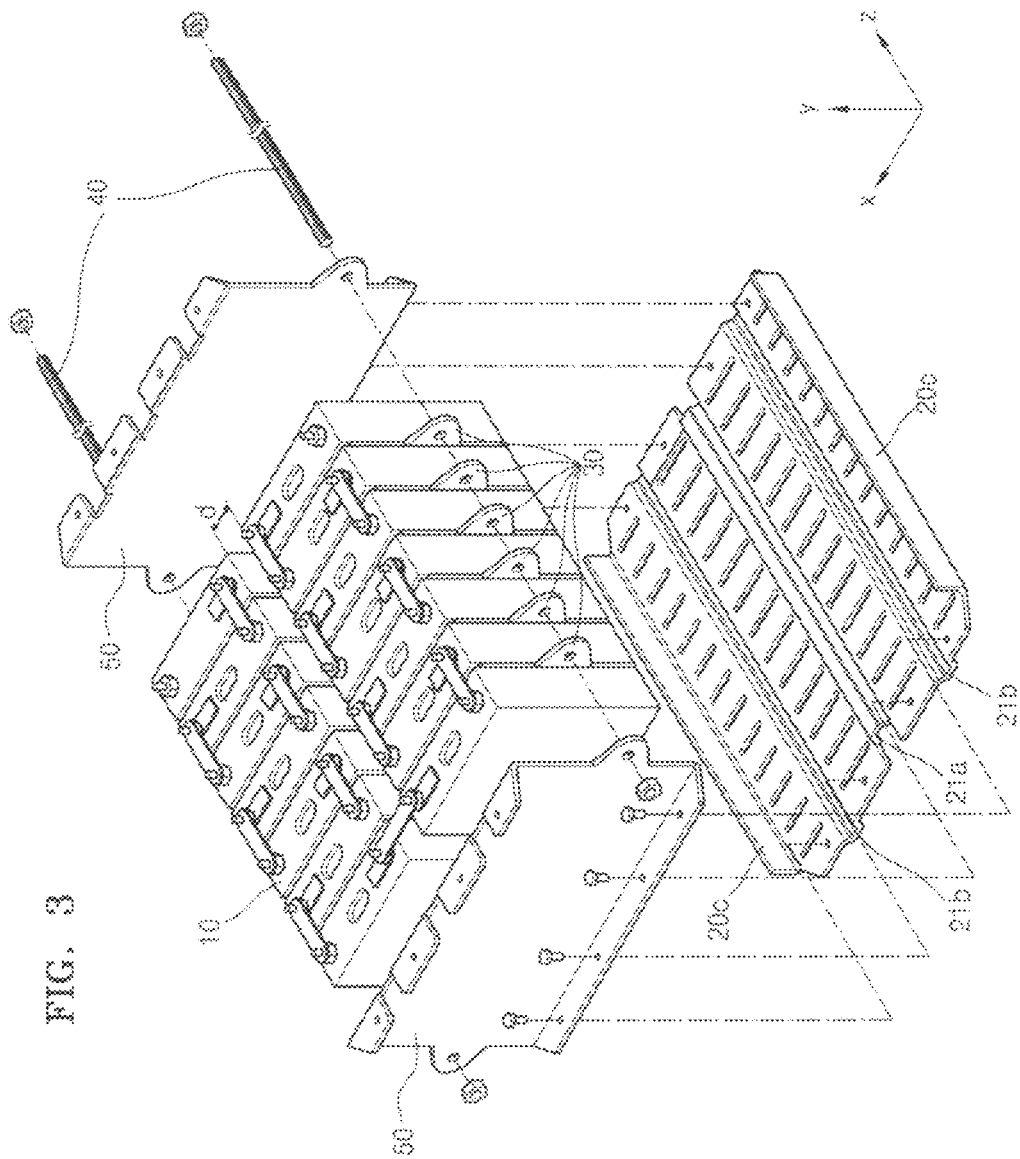
FIG. 3 illustrates an exploded perspective view of a battery module according to another embodiment.
Figure 4:
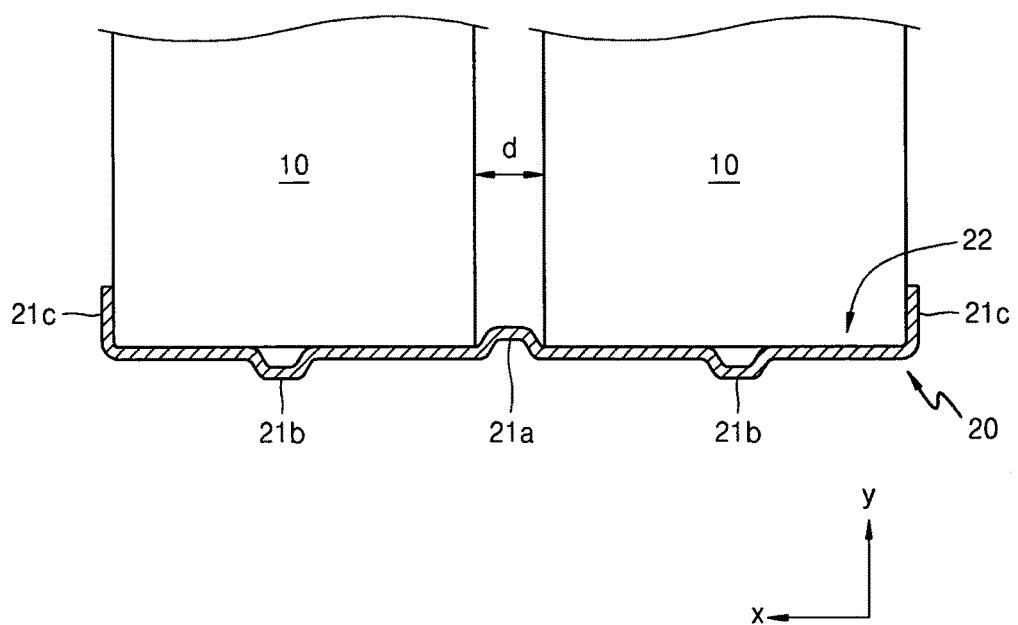
FIG. 4 illustrates a cross-sectional view of the battery module in FIG. 3.

FIGS. 3 and 4 illustrate perspective views of a battery module according to another embodiment. The battery module in FIGS. 3 and 4 may be substantially the same as the battery in FIGS. 1 and 2, with the exception of having a different configuration of the bent portions.

Referring to FIGS. 3 and 4, the battery module may include a center bent portion 21a and side bent portions 21b on the base plate 20 in order to increase the strength of the base plate 20. The side bent portions 21b may be substantially the same as the bent portions 21 described previously with reference to FIGS. 1 and 2. The center bent portion 21a may protrude from the base plate 20 toward the batteries 10, i.e., the center bent portion 21a and the side bent portions 21b may protrude in opposite direction. The center bent portion 21a may be between two side bent portions 21b, and may be spaced apart therefrom. The center bent portion 21a may extend along the longitudinal direction of the battery module, and may be positioned in a center of the battery module. Therefore, the center bent portion 21a may divide the base plate 20 into two, such that one row of batteries 10 may be placed on each half of the base plate 20. With the exception of the protrusion direction, the structure of the center bent portion 21a may be substantially the same as that of the protrusion 21, e.g., square bar shaped.

Further, as illustrated in FIG. 4, a width d of the center bent portion 21a may be adjusted to define recesses 22 for holding the batteries 10, i.e., a width of each recess 22 along the x-axis between an edge of the center bent portion 21a and a wall 20c of the base plate 20 may substantially equal a width of the battery 10. In addition, when the batteries 10 are mounted in the recesses, the batteries 10 may be stably coupled to the base plate 20. Also, as the width d of the center bent portion 21a may equal a distance between the two rows of batteries 10, the distance between the rows of batteries 10 may be increased by the center bent portion 21a, and thus, an insulating member may not be required between the rows of the batteries 10. That is, the distance d between the rows of batteries 10 may be adjusted by the width d of the protruding center bent portion 21a to define a sufficient distance between the rows of batteries 10, so an insulating member may not be necessary. Therefore, according to the embodiment in FIGS. 3 and 4, an insulating member between the rows of batteries 10 may be omitted, while the battery nodule may stably support the batteries 10 with an increasing strength of the base plate 20. In contrast, when rows of batteries are attached to each other, an insulating member may be required therebetween.

Therefore, a battery module according to example embodiments may include reinforcing portions on the base plate in order to increase the strength of the base plate. Accordingly, a deformation of the base plate caused by the load applied thereto may be efficiently prevented or substantially minimized, thereby enabling stable configuration of the battery module.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
a base plate;
a plurality of batteries, bottom surfaces of all of the plurality of batteries facing the base plate and being directly on the base plate; and
a reinforcing portion including a first bent portion on the base plate, the first bent portion defining a groove in the base plate that protrudes away from the bottom surfaces of the plurality of batteries, the groove overlapping bottom surfaces of batteries in a single row of batteries of the plurality of batteries and defining an enclosed space between the base plate and each of the batteries in the single row of batteries.

2. The battery module as claimed in claim 1, wherein the first bent portion is integral with the base plate.

3. The battery module as claimed in claim 1, wherein the reinforcing portion further comprises a second bent portion on the base plate and protruding toward the plurality of batteries, the second bent portion extending from the base plate between two adjacent rows of batteries.

4. The battery module as claimed in claim 3, wherein the second bent portion has a predetermined width to define a distance between the two adjacent rows of batteries.

5. The battery module as claimed in claim 1, wherein the reinforcing portion includes a plurality of first bent portions protruding away from the batteries, each of the first bent portions overlapping bottom surfaces of different batteries.

6. The battery module as claimed in claim 3, wherein the second bent portion defines recesses in the base plate, each recess having a square bar shape and retaining one row of batteries of the plurality of batteries, each of the batteries being directly on the base plate.

7. The battery module as claimed in claim 1, wherein the plurality of batteries is disposed between a pair of end plates, and the pair of end plates are coupled to the base plate.

8. The battery module as claimed in claim 7, further comprising:
a plurality of separation plates installed between the plurality of batteries; and
a side bar connecting the end plates to the separation plates.

9. The battery module as claimed in claim 1, wherein the reinforcing portion further comprises a second bent portion on the base plate, the second bent portion extending from the base plate between two adjacent rows of batteries and being spaced apart from the first bent portion.

10. The battery module as claimed in claim 9, wherein the first and second bent portions protrude in opposite directions.

11. The battery module as claimed in claim 5, wherein each first bent portion extends on an entire length of the base plate along a longitudinal direction of the base plate, each first bent portion overlapping bottom surfaces of batteries in a different row of batteries of the plurality of batteries.

12. The battery module as claimed in claim 9, wherein the first and second bent portions protrude in a same direction.

13. A battery pack including a plurality of battery modules as claimed in claim 1.

14. The battery module as claimed in claim 1, wherein:
the plurality of batteries are arranged along a first direction and a second direction substantially perpendicular to the first direction,
the first bent portion extends in the base plate to overlap the bottom surfaces of all the batteries arranged along the second direction, and
the reinforcing portion includes at least one second bent portion extending along the second direction, the second bent portion being a groove in the base plate between adjacent batteries in the first direction.

15. The battery module as claimed in claim 2, wherein the groove has a U-shaped cross-section, an upper surface of the base plate and the groove being continuous.

16. The battery module as claimed in claim 1, wherein a width of the groove is substantially smaller than a width of a flat surface of the base plate adjacent to the groove, widths of the groove and flat surface being measured along a direction substantially perpendicular to a longitudinal direction of the base plate.

17. A battery module, comprising:
a substantially flat base plate;
a plurality of batteries, each one of bottom surfaces of the plurality of batteries facing a top surface of the base plate and being directly on the base plate; and
a reinforcing portion on the base plate, the reinforcing portion including at least one groove extending along a majority of a longitudinal direction of the base plate and protruding away from the top surface of the base plate, a length of a battery being larger than a width of the groove,
wherein the length of the battery extends along a longitudinal direction of the battery and parallel to the width of the groove, and wherein the length of the battery and the width of the groove extend along a direction perpendicular to the longitudinal direction of the base plate.

18. The battery module as claimed in claim 17, wherein the at least one groove of the reinforcing portion includes:
at least one first groove overlapping bottom surfaces of batteries in a single row of batteries; and
a second groove, the second groove being spaced apart from the first groove and being in a non-overlapping relationship with bottom surfaces of the batteries in the single row of batteries.

19. The battery module as claimed in claim 18, wherein the first groove defines an enclosed space between the base plate and each of the batteries in the single row of batteries.

20. The battery module as claimed in claim 17, wherein the at least one groove extends along an entire top surface of the base plate along the longitudinal direction of the base plate.

* * * * *